(12) United States Patent
Shoda et al.

(10) Patent No.: US 9,534,953 B2
(45) Date of Patent: Jan. 3, 2017

(54) LASER OUTPUT MEASURING APPARATUS

(75) Inventors: Fumio Shoda, Tokyo (JP); Hidenori Fukahori, Tokyo (JP); Takayuki Yanagisawa, Tokyo (JP); Mitoru Yabe, Tokyo (JP); Tetsuya Nishimura, Tokyo (JP); Shuhei Yamamoto, Tokyo (JP); Yoko Inoue, Tokyo (JP); Tetsuo Funakura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 14/356,247

(22) PCT Filed: Dec. 27, 2011

(86) PCT No.: PCT/JP2011/007314
§ 371 (c)(1),
(2), (4) Date: May 5, 2014

(87) PCT Pub. No.: WO2013/098887
PCT Pub. Date: Jul. 4, 2013

(65) Prior Publication Data
US 2014/0285804 A1    Sep. 25, 2014

(51) Int. Cl.
*G01J 1/42*    (2006.01)
*G01J 1/04*    (2006.01)
*G01J 1/22*    (2006.01)

(52) U.S. Cl.
CPC ........... *G01J 1/4257* (2013.01); *G01J 1/0407* (2013.01); *G01J 1/0411* (2013.01); *G01J 1/0414* (2013.01);
(Continued)

(58) Field of Classification Search
CPC ...... G01J 1/0429; G01J 1/0448; G01J 1/4257; G01J 1/0407; G01J 1/0411; G01J 1/0414; G01J 1/0474; G01J 1/22
See application file for complete search history.

(56) References Cited

U.S. PATENT DOCUMENTS 3,767,310 A * 10/1973 Dickson .................. G02B 5/32
                                                       356/218
4,011,523 A *  3/1977 Mansell .............. H01S 3/08018
                                                       372/101
(Continued)

FOREIGN PATENT DOCUMENTS

EP    0 600 636 A1    6/1994
EP    2 767 809 A1    8/2014
(Continued)

OTHER PUBLICATIONS

Office Action issued Nov. 11, 2014 in Japanese Patent Application No. 2013-551033 (with partial English language translation).
(Continued)

*Primary Examiner* — Gordon J Stock, Jr.
(74) *Attorney, Agent, or Firm* — Oblon, McClelland, Maier & Neustadt, L.L.P.

(57) ABSTRACT

A laser output measuring apparatus in which an optical separator is disposed in a position that is rotated by a predetermined angle about an optical axis of a laser beam converged by a lens, and further rotated by a predetermined angle about the optical axis of the laser beam and a straight line perpendicular to an incident surface of the laser beam.

5 Claims, 5 Drawing Sheets

(52) U.S. Cl.
CPC ............ *G01J 1/0429* (2013.01); *G01J 1/0448* (2013.01); *G01J 1/0474* (2013.01); *G01J 1/22* (2013.01)

(56) References Cited

U.S. PATENT DOCUMENTS

| | | | |
|---|---|---|---|
| 4,689,482 A * | 8/1987 | Horikawa | G02B 26/123 219/121.61 |
| 7,253,386 B2 * | 8/2007 | Ernst | G01J 1/04 250/205 |
| 2005/0041703 A1 | 2/2005 | Momiuchi et al. | |
| 2011/0228230 A1 | 9/2011 | Inoue et al. | |
| 2014/0091198 A1 | 4/2014 | Shoda et al. | |

FOREIGN PATENT DOCUMENTS

| | | |
|---|---|---|
| JP | 60-153187 A | 8/1985 |
| JP | 63-101813 A | 5/1988 |
| JP | 4-220535 | 8/1992 |
| JP | 6-268308 | 9/1994 |
| JP | 8-330659 A | 12/1996 |
| JP | 9-159966 A | 6/1997 |
| JP | 2002-48911 | 2/2002 |
| JP | 2003-90978 A | 3/2003 |
| JP | 2005-101504 | 4/2005 |
| JP | 2007-214189 A | 8/2007 |
| WO | WO 2010/100898 A1 | 9/2010 |

OTHER PUBLICATIONS

Extended European Search Report issued Aug. 26, 2015 in Patent Application No. 11878355.4.
International Search Report issued Apr. 17, 2012, in PCT/JP2011/007314, filed Dec. 27, 2011.
Combined Office Action and Search Report issued on May 5, 2015 in Chinese Patent Application No. 201180075886.0 with partial English translation and English translation of category of cited documents.
Japanese Office Action issued Mar. 1, 2016 in Patent Application No. 2013-551033 (with partial English translation).

* cited by examiner

LASER OUTPUT MEASURING APPARATUS

TECHNICAL FIELD

The present invention relates to a laser output measuring apparatus for measuring an intensity of a laser beam in adjusting an output of the laser beam oscillated from a laser oscillator.

BACKGROUND ART

Heretofore, in adjusting an output of a laser beam oscillated from a laser oscillator, an intensity of the laser beam oscillated from the laser oscillator is measured using a laser output measuring apparatus.

Figure 12:
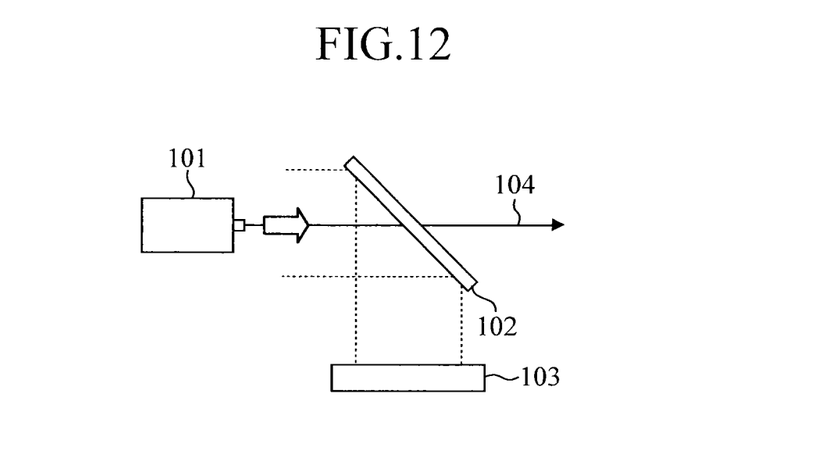
FIG. 12 is a configuration diagram showing a conventional laser output measuring apparatus disclosed in Patent Document 1.

FIG. 12 is a configuration diagram showing a conventional laser output measuring apparatus disclosed in the following Patent Document 1.

As shown in FIG. 12, the conventional laser output measuring apparatus is configured with an optical separator 102 that reflects a part of a laser beam emitted from a laser oscillator 101 as a monitoring beam, and a photodetector 103 that detects an intensity of a reflected beam from the optical separator 102.

The intensity measured by the photodetector 103 is fed back to the laser oscillator 101, and the output of the laser beam is adjusted according to a measurement result of the intensity.

On the other hand, the laser beam transmitted through the optical separator 102 is used for an original purpose of the laser beam.

In this case, the optical separator 102 is disposed in a state inclined at a predetermined angle (usually, inclined at 45°) with respect to a direction of an optical axis 104 of the laser beam emitted from the laser oscillator 101.

Further, in order for a reflection surface of the optical separator 102 to have an intended reflectivity, a partially reflective coating of a dielectric multilayer film is usually applied thereon.

Since the partially reflective coating serves to reflect the part of the laser beam for the purpose of measuring an intensity of the laser beam, it is usually the coating in a low reflectivity region.

The dielectric film of the partially reflective coating has a property in which the reflectivity changes due to absorption of atmospheric moisture or due to temperature.

For example, when the optical separator 102 of 1% in reflectivity (99% in transmission) is used, a change of 0.1% in reflectivity results in an output change of 10% (=0.1%/1.0%) in the output change of the laser beam reflected by the optical separator 102.

Accordingly, even though deterioration occurs in the dielectric film of the partially reflective coating, and the reflectivity thereof varies slightly, a large output change in the reflected laser beam occurs.

Incidentally, the following is known: it is difficult to control a dielectric film having a low reflectivity, so that a large variation thereof occurs, and also the formation of the film is costly.

In the conventional laser output measuring apparatus, the photodetector 103 detects the intensity of the laser beam reflected by the optical separator 102 as mentioned above; however, when the laser beam emitted from the laser oscillator 101 enters the optical separator 102, an incident angle of the laser beam differs depending on an incident position thereon, so that the reflectivity of the laser beam reflected by the optical separator 102 differs depending on the incident position. For this reason, it is difficult to measure accurately the output of the laser beam emitted from the laser oscillator 101.

Thus, instead of the dielectric multilayer involving a larger variation in reflectivity depending on the incident angle, a method that applies a coating of a metal film on the reflection surface of the optical separator 102 is considered; however, even in this case, the formation of the film is costly, which makes the laser output measuring apparatus expensive.

PRIOR ART DOCUMENTS

Patent Documents

Patent Document 1: Japanese Patent Application Laid-open No. H04 (1992)-220535 (paragraph number [0008], FIG. 1)

SUMMARY OF THE INVENTION

Problems to be Solved by the Invention

Since the conventional laser output measuring apparatus is configured as mentioned above, due to the occurrence of deterioration in the dielectric film of the partially reflective coating applied on the reflection surface of the optical separator 102, even though the reflectivity thereof changes slightly, a large output change in the reflected laser beam occurs. For this reason, there is a problem such that an accurate measurement for the intensity of the laser beam is difficult.

In addition, it is difficult to control the dielectric film in a low reflectivity; a large variation thereof occurs, and also the formation of the film is costly, which poses a problem to make the laser output measuring apparatus expensive.

Further, in a case where it is desired to measure the output at a beam converged position, when a lens for convergence is disposed upstream of the optical separator, an angle of the converged laser beam incident on the optical separator differs depending on the incident position, and thus the reflectivity of the laser beam varies depending on the incident position. For this reason, taking into consideration, for instance, an output variation due to deterioration of the lens for convergence, there is a problem that it is difficult to observe the output at the beam converged position.

Thus, instead of the dielectric multilayer film involving a larger variation in reflectivity depending on the incident angle, the method that applies the coating of the metal film on the reflection surface of the optical separator 102 is taken into consideration; however, even in this case, the formation of the film is costly, which poses a problem to make the laser output measuring apparatus expensive.

The present invention has been made to solve the foregoing problems, and an object of the invention is to provide a laser output measuring apparatus that can measure accurately the intensity of the converged laser beam without using an expensive optical separator.

Means for Solving the Problems

A laser output measuring apparatus according to the present invention include: a lens that converges a laser beam incident thereon; an optical separator that reflects a part of the laser beam according to a polarization direction of the laser beam converged by the lens and a Fresnel reflectivity that depends on an incident angle of the laser beam; a photodetector that measures an intensity of the laser beam reflected by the optical separator; and a first angle adjusting mechanism that rotates the optical separator by a predetermined angle about an optical axis of the laser beam converged by the lens, and the optical separator is disposed in a position that is rotated by the predetermined angle about the optical axis of the laser beam converged by the lens, and rotated by a predetermined angle about a straight line perpendicular to the optical axis of the laser beam and an incident surface of the laser beam.

Effect of the Invention

According to the present invention, it is configured to include: the lens that converges the laser beam incident thereon; the optical separator that reflects the part of the laser beam according to a polarization direction of the laser beam converged by the lens and the Fresnel reflectivity that depends on the incident angle of the laser beam; the photodetector that measures the intensity of the laser beam reflected by the optical separator; the first angle adjusting mechanism that rotates the optical separator by the predetermined angle about the optical axis of the laser beam converged by the lens, and the optical separator is disposed in the position that is rotated by the predetermined angle about the optical axis of the laser beam converged by the lens, and rotated by the predetermined angle about the straight line perpendicular to the optical axis of the laser beam and the incident surface of the laser beam; thus, there is an advantageous effect that can measure accurately an intensity of the converged laser beam without using an expensive optical separator.

BEST MODE FOR CARRYING OUT THE INVENTION

Embodiment 1

Figure 1:
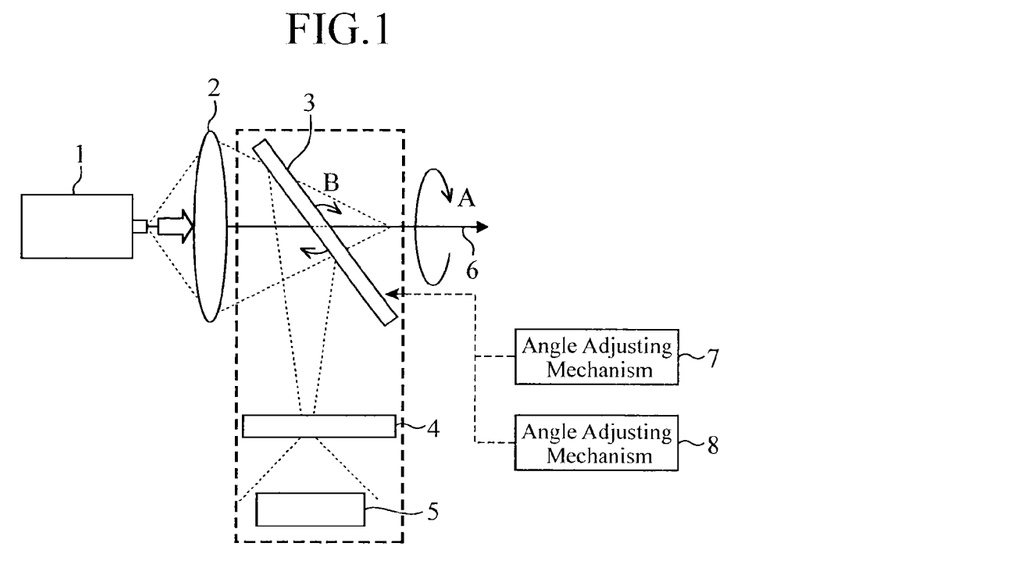
FIG. 1 is a side view showing a laser output measuring apparatus according to Embodiment 1 of the present invention.

FIG. 1 is a side view showing a laser output measuring apparatus according to Embodiment 1 of the present invention.

In FIG. 1, a laser oscillator 1 is the oscillator that oscillates a laser beam.

However, since a P-wave and an S-wave of the laser beam oscillated from the laser oscillator 1 to be made incident on an optical separator 3 are required to be incident thereon at a fixed ratio without a temporal change, in this Embodiment 1, it is assumed that the laser beam oscillated from the laser oscillator 1 is a substantially linearly polarized laser beam.

Incidentally, since the P-wave and S-wave of the laser beam except for a completely non-polarized beam are made incident on the optical separator 3 at a fixed ratio, it is applicable to the present invention.

A lens 2 is an optical component that converges the laser beam oscillated from the laser oscillator 1.

The optical separator 3 is an optical component that reflects a part of the laser beam converged by the lens 2 according to a Fresnel reflectivity that depends on a polarization direction and an incident angle thereon of the laser beam.

A partially reflective coating is not applied on a reflection surface of the optical separator 3. Instead, the optical separator 3 is disposed in a position that is rotated by a predetermined angle $\theta_1$ about an optical axis of the laser beam converged by the lens 2 (in an arrow A direction), and further rotated by a predetermined angle $\theta_2$ about a straight line (in an arrow B direction) perpendicular to the optical axis 6 of the laser beam and an incident surface of the laser beam (reflection surface of the optical separator 3).

A diffuser plate 4 is disposed on a path of the laser beam reflected by the optical separator 3, and is an optical component that diffuses the laser beam and makes the diffused light of the laser beam incident on a photodetector 5.

The photodetector 5 is disposed in the post stage of the diffuser plate 4, and is the detector that measures an intensity of the laser beam diffused by the diffuser plate 4.

Note that the optical separator 3, diffuser plate 4, and photodetector 5 are integrally configured with each other, so that the diffuser plate 4 and photodetector 5 are rotated integrally with the optical separator 3 when the optical separator 3 is rotated by angle adjusting mechanisms 7, 8 described later.

The angle adjusting mechanism 7 that is a first angle adjusting mechanism is an actuator that rotates the optical separator 3 by the predetermined angle $\theta_1$ about the optical axis of the laser beam converged by the lens 2 (in the arrow A direction).

The angle adjusting mechanism 8 that is a second angle adjusting mechanism is an actuator that rotates the optical separator by the predetermined angle $\theta_2$ about the straight line (in the arrow B direction) perpendicular to the optical axis 6 of the laser beam converged by the lens 2 and the incident surface of the laser beam (reflection surface of the optical separator 3).

Next, an operation thereof will be described.

When the laser oscillator 1 oscillates the laser beam, the lens 2 converges the laser beam.

The optical separator 3 reflects a part of the laser beam converged by the lens toward the diffuser plate 4, and transmits the other laser beam.

Here, the reflection of the laser beam by the optical separator 3 is made based on the Fresnel reflectivity that depends on the polarization direction of the laser beam and the incident angle of the laser beam.

The Fresnel reflectivity is adjusted such that the angle adjusting mechanisms 7, 8 rotate the optical separator 3.

In the following, a description will be given of an adjustment in reflectivity of the optical separator 3 by the angle adjusting mechanisms 7, 8.

Figure 2:
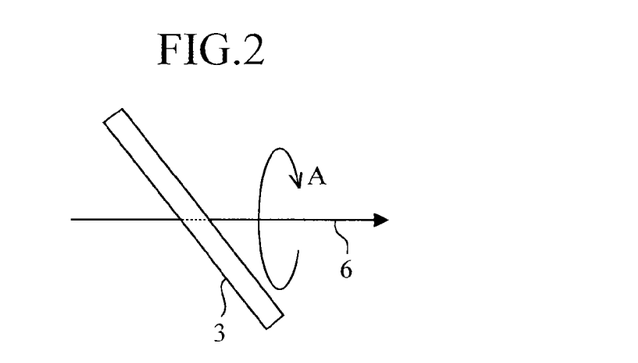
FIG. 2 is a side view showing a rotation about an optical axis of a laser beam by an angle adjusting mechanism 7.
Figure 3:
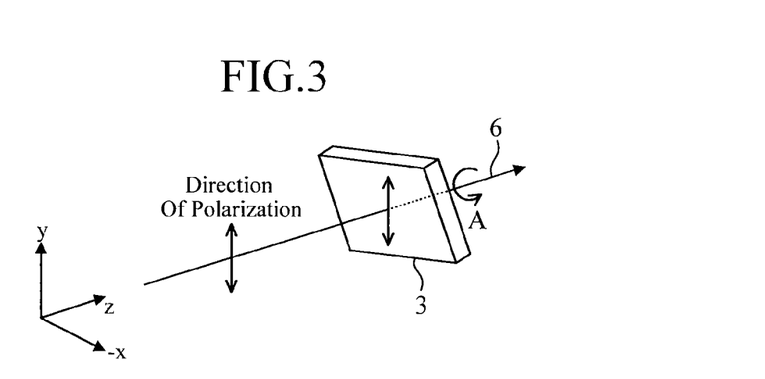
FIG. 3 is a perspective view showing the rotation about the optical axis of the laser beam by the angle adjusting mechanism 7.

FIG. 2 is a side view showing a rotation about the optical axis of the laser beam by the angle adjusting mechanism 7, and FIG. 3 is a perspective view showing the rotation about the optical axis of the laser beam by the angle adjusting mechanism 7.

Figure 4:
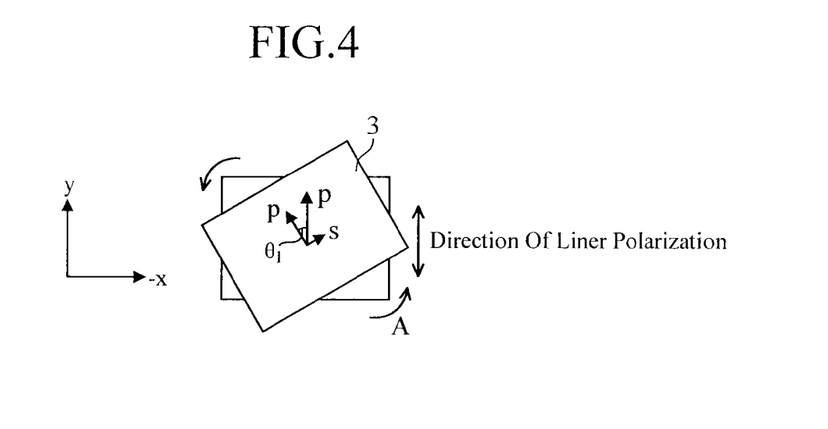
FIG. 4 is an illustration diagram showing an adjustment of a ratio of a vertical polarization wave (P-wave) and a horizontal polarization wave (S-wave) of the laser beam by the angle adjusting mechanism 7.

Further, FIG. 4 is an illustration diagram showing an adjustment of a ratio of a vertical polarization wave (P-wave) and a horizontal polarization wave (S-wave) in the laser beam by the angle adjusting mechanism 7.

The angle adjusting mechanism 7 rotates the optical separator 3 by the predetermined angle $\theta_1$ (rotation in a range from 0° to 90°) about the optical axis of the laser beam converged by the lens 2 (in the arrow A direction) to thereby adjust the Fresnel reflectivity of the optical separator 3.

Here, as shown in FIG. 4, the laser beam incident on the optical separator 3 is assumed to have only a p-polarization component when the angle $\theta_1=0°$.

At this time, when the angle adjusting mechanism 7 rotates the optical separator 3 in the arrow A direction, an s-polarization component emerges, whereas the p-polarization component decreases.

Thereafter, when the angle $\theta_1=90°$ is performed, as shown in FIG. 4, the p-polarization component vanishes, while only the s-polarization component remains.

Thus, when the angle adjusting mechanism 7 rotates the optical separator 3 in the arrow A direction, it is possible to adjust the ratio of the vertical polarization wave (P-wave) and the horizontal polarization wave (S-wave) in the laser beam.

Figure 5:
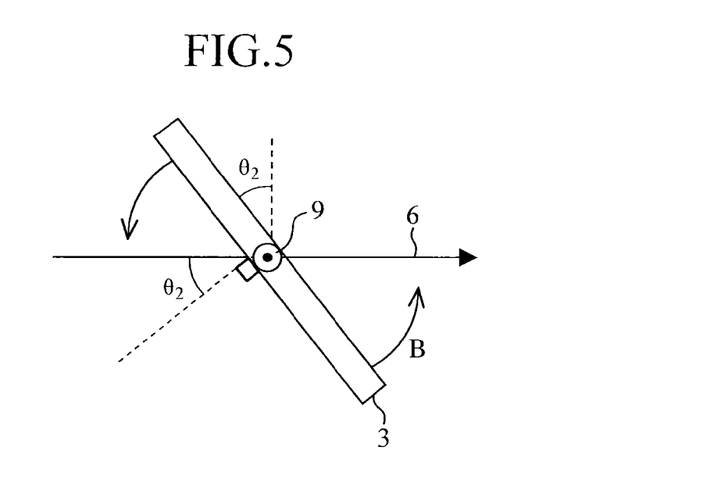
FIG. 5 is a top view showing a rotation about the optical axis of the laser beam, and a straight line perpendicular to an incident surface of the laser beam by an angle adjusting mechanism 8.
Figure 6:
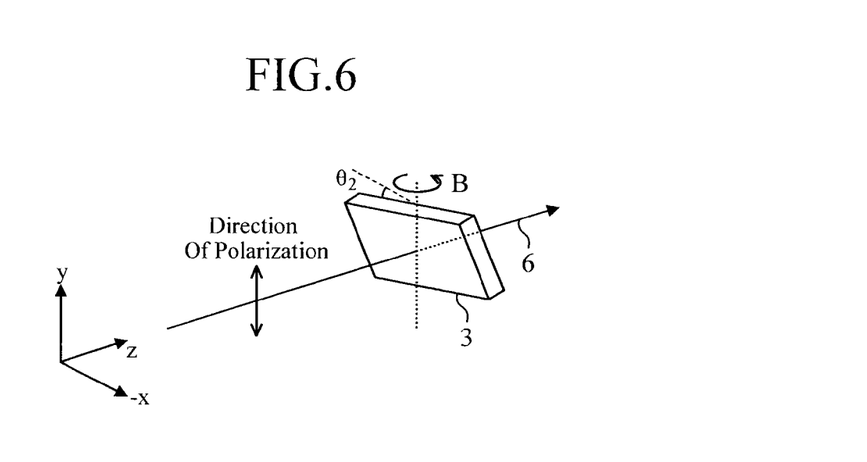
FIG. 6 is a perspective view showing the rotation about the optical axis of the laser beam, and the straight line perpendicular to the incident surface of the laser beam by the angle adjusting mechanism 8.

FIG. 5 is a top view showing a rotation about a straight line perpendicular to an optical axis 6 of the laser beam and the incident surface of the laser beam by the angle adjusting mechanism 8, and FIG. 6 is a perspective view showing a rotation about the straight line perpendicular to the optical axis 6 of the laser beam and the incident surface of the laser beam by the angle adjusting mechanism 8.

The angle adjusting mechanism 8 rotates the optical separator by the predetermined angle $\theta_2$ (rotation in the range from 0° to 90°) about a straight line 9 (in the arrow B direction) perpendicular to the optical axis 6 of the laser beam converged by the lens 2 and the incident surface of the laser beam (reflection surface of the optical separator 3) to thereby adjust a reflectivity of the p-polarization component and a reflectivity of the s-polarization component of the optical separator 3.

That is, when the angle $\theta_2$ of the optical separator 3 is adjusted by the angle adjusting mechanism 8, the incident angle of the laser beam incident on the reflection surface of the optical separator 3 is adjusted.

Since the reflectivity of the p-polarization component and the reflectivity of the s-polarization component are determined according to the incident angle of the laser beam on the optical separator 3, it is possible to adjust the reflectivity of the p-polarization component and the reflectivity of the s-polarization component when the optical separator 3 is rotated about the straight line 9 (in arrow B-direction) by the angle adjusting mechanism 8.

Here, since the partially reflective coating is not applied on the reflection surface of the optical separator 3, a Fresnel reflection occurs on the reflection surface.

For the respective vertical polarization wave (P-wave) and horizontal polarization wave (S-wave) in the incident laser beam, the optical separator 3 has reflectivities of $R_P$ and $R_S$ that depend on a refraction index of the material of the reflection surface.

When the refraction index of the material of the reflection surface in the optical separator 3 is defined as "n", and the incident angle of the laser beam to the optical separator 3 is defined as "$\theta_0$", the reflectivities of $R_P$ and $R_S$ of the beam at the boundary between air and the optical separator 3 are represented by the following formulae (1) and (2).

Reflectivity $R_P$ for P-wave $$R_p = \left[\tan\left\{\theta_0 - \sin^{-1}\left(\frac{1}{n}\sin\theta_0\right)\right\} \middle/ \tan\left\{\theta_0 + \sin^{-1}\left(\frac{1}{n}\sin\theta_0\right)\right\}\right]^2 \cdot \text{Reflectivity} \quad (1)$$

$R_s$ for the S-wave $$R_s = \left[\sin\left\{\theta_0 - \sin^{-1}\left(\frac{1}{n}\sin\theta_0\right)\right\} \middle/ \sin\left\{\theta_0 + \sin^{-1}\left(\frac{1}{n}\sin\theta_0\right)\right\}\right]^2 \quad (2)$$

From the formulae (1) and (2), it can be seen that the reflectivities $R_p$, $R_s$ in the optical separator 3 are determined by the refraction index n of the material of the reflection surface and the incident angle $\theta_0$ of the laser beam to the optical separator 3.

Then, the total reflectivity of the optical separator 3 is determined according to the ratio of the vertical polarization wave (P-wave) and the horizontal polarization wave (S-wave) in the incident laser beam.

Taking into consideration the reflection on the reflection surface and the reflection light at the one-side end face of the laser beam passing through the material of the optical separator 3, the total reflectivity of the optical separator 3 is represented by the following formula (3).

Total reflectivity of the optical separator 3=(Rate of P-wave component)*(Reflectivity $R_P$ of P-wave)+(Rate of S-wave component)*(Reflectivity $R_S$ of S-wave)+(Rate of P-wave component)*(Transmittance $T_P$ of P-wave)*(Reflectivity $R_P$ of P-wave)+(Rate of S-wave component) *(Transmittance $T_S$ of S-wave)*(Reflectivity $R_S$ of S-wave) (3)

In the formula (3), the first and second terms represent the beams in which the P-wave and S-wave are reflected on the reflection surface, and the third and fourth terms represent the beams that pass through the optical separator 3 to be reflected at the one-side end face.

Further, with respect to Reflectivity $R_P$ of P-wave, Transmittance $T_P$ of P-wave has a relationship of $T_P=1-R_P$, and with respect to the S-wave, similarly, there is provided a relationship of $T_S=1-R_S$.

Figure 7:
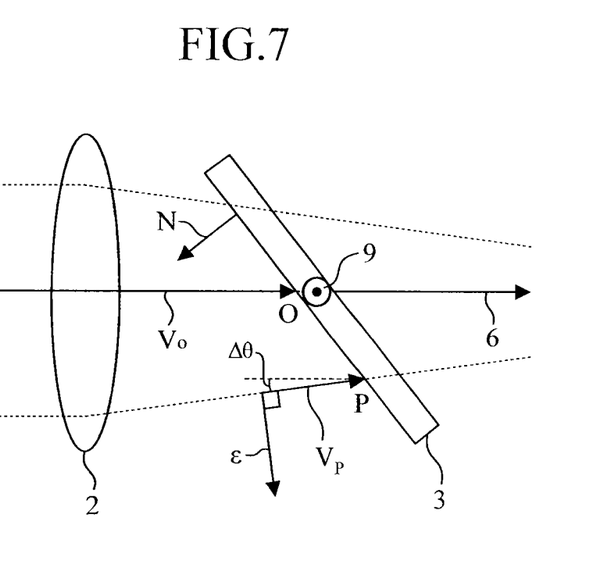
FIG. 7 is an illustration diagram showing that when the laser beam converged by a lens 2 is made incident on an optical separator 3, an incident angle changes depending on an incident position thereof.

FIG. 7 is an illustration diagram showing that when the laser beam converged by the lens 2 is made incident on the optical separator 3, the incident angle changes depending on the incident position.

When the laser beam converged by the lens 2 is made incident on the optical separator 3, the incident angle changes depending on the incident position, as shown in FIG. 7.

For example, when a beam vector $V_O$ at the center position O of the optical separator 3 is compared with a beam vector $V_P$ of the laser beam incident on a point P, it can be seen that the incident angle to the optical separator 3 differs depending on the incident position.

As mentioned above, what the incident angle to the optical separator 3 differs depending on the incident position causes a problem that the reflectivity of the laser beam differs depending on the position of the optical separator 3, which hinders a stable laser output measurement.

The laser beam at the center position O of the optical separator 3 has the beam vector $V_O$ along the optical axis 6 (z-axis), whereas the laser beam at the point P of the optical separator 3 has the beam vector $V_P$ at an angle deviated by $\Delta\theta$ from the optical axis 6.

Here, a polarized beam vector of the laser beam incident on the point P is defined as "∈", and a normal vector of the optical separator 3 is defined as "N".

However, it is assumed that the beam vectors $V_O$, $V_P$ and the polarized beam vector ∈ have no components in the direction of the straight line 9 (y-axis).

Figure 8:
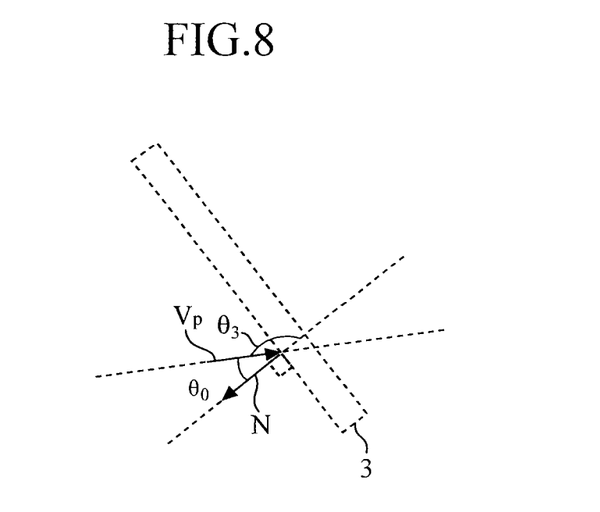
FIG. 8 is an illustration diagram showing an angle $\theta_3$ between a beam vector $V_P$ and a normal vector N.

As shown in FIG. 8, when an angle between the beam vector $V_P$ and the normal vector N is defined as $\theta_3$, this angle $\theta_3$ can be determined by calculating an inner product or an outer product of the beam vector $V_P$ and the normal vector N.

In addition, since the incident angle $\theta_0$ of the laser beam to the optical separator 3 and the angle $\theta_3$ between the beam vector $V_P$ and the normal vector N have the following relationship, the incident angle $\theta_0$ of the laser beam is obtained.

$$\theta_0 = \theta_3 - 180°$$

Further, since the outer product $V_P * N$ of the beam vector $V_P$ and the normal vector N has a direction perpendicular to the incident surface, it corresponds to an s-polarization direction of the laser beam incident on the optical separator 3.

Here, a unit vector of $V_P * N$ is defined as "$e_s$" (unit vector in the s-polarization direction of the incident laser beam).

At this time, since a p-polarization direction thereof is perpendicular to the s-polarization direction and the incident direction, it is represented by an outer product $V_P * e_s$ of the beam vector $V_P$ and the unit vector $e_s$ in the s-polarization direction.

Additionally, when a unit vector of the incident laser beam in the p-polarization direction is defined as $e_p$ ($= V_P * e_s$), a ratio of a P-wave component and an S-wave component in the incident laser beam can be determined by solving the polarized beam vector E into a direction of the unit vector $e_p$ in the p-polarization direction, and a direction of the unit vector $e_s$ in the s-polarization direction.

Figure 9:
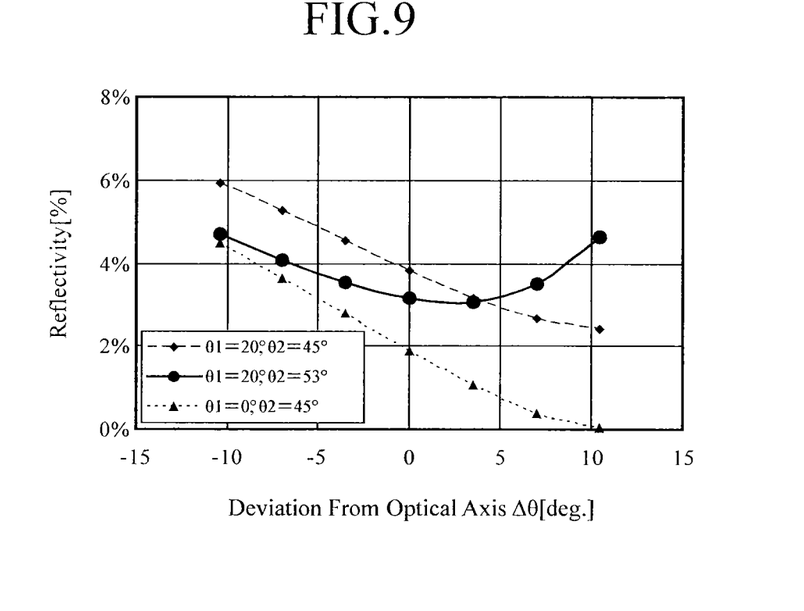
FIG. 9 is an illustration diagram showing a relationship between a deviation angle $\Delta\theta$ from the optical axis of the laser beam made incident on the optical separator 3 and a reflectivity thereof.

FIG. 9 is an illustration diagram showing a relationship between the deviated angle $\Delta\theta$ from the optical axis 6 of the laser beam to be incident on the optical separator 3 and a reflectivity thereof.

In FIG. 9, calculation results for $\Delta\theta = -10.4°$ to $10.4°$ are shown. The reflectivity is calculated from the formula (3) with the deviation $\Delta\theta$ from the optical axis.

Here, in a case where the rotation angle $\theta_2$ about the straight line 9 that is perpendicular to the optical axis 6 of the laser beam and the incident surface of the laser beam is 45°, and the rotation angle $\theta_1$ of the optical separator 3 about the optical axis 6 is 0°, the reflectivity depending on the incident position ranges from 0% to 4.5%, which varies greatly.

When the rotation angle $\theta_1$ of the optical separator 3 about the optical axis 6 is adjusted to 20° by the angle adjusting mechanism 7, the reflectivity depending on the incident position ranges from 2.4% to 5.9%.

Further, when the rotation angle $\theta_2$ about the straight line 9 that is perpendicular to the optical axis 6 of the laser beam and the incident surface of the laser beam is adjusted to 53° by the angle adjusting mechanism 8, the reflectivity depending on the incident position ranges from 3.1% to 4.7%.

As described above, when the angle $\theta_1$ of the optical separator 3 about the optical axis 6, and the angle $\theta_2$ thereof about the straight line 9 perpendicular to the optical axis 6 of the laser beam and the incident surface of the laser beam are adjusted, it is possible to average the reflectivity of the optical separator 3 with respect to the deviation $\Delta\theta$ of the laser beam from the optical axis 6.

As mentioned above, the diffuser plate 4 is disposed on the path of the laser beam reflected by the optical separator 3 in which the angles $\theta_1$, $\theta_2$ are adjusted (the optical separator in which the reflectivity is averaged with respect to the deviation $\Delta\theta$ of the laser beam from the optical axis 6); thus, the laser beam reflected by the optical separator 3 is uniformly diffused, and such diffused beam of the laser beam is made incident on the photodetector 5.

The photodetector 5 is disposed in the post stage of the diffuser plate 4, and measures an intensity of the laser beam diffused by the diffuser plate 4.

According to Embodiment 1, since the photodetector 5 is disposed in the post stage of the diffuser plate 4, it is possible to accurately make a constant fraction of the beam incident on the photodetector 5 without changing the position of the photodetector 5, even when the optical path of the reflected beam is changed at the time of adjusting the angle of the optical separator 3, or the spatial energy distribution of the laser beam is non-uniform. Thus, it becomes possible to accurately measure the intensity of the laser beam.

Here, since the laser beam is diffused by the diffuser plate 4, there is no limit for the aperture area of the photodetector 5; however, in order to measure the power accurately, it is desirable that the aperture area of the photodetector 5 be smaller than the diffused area of the laser beam.

In this manner, even if a slight variation occurs in the optical path of the laser beam, it becomes possible to measure accurately the intensity of the laser beam without receiving influence thereof.

In this Embodiment 1, the optical separator 3, diffuser plate 4, and photodetector 5 are configured integrally with each other. This is made to prevent the reflected beam from being not incident on the diffuser plate 4 and the photodetector 5 when the optical path of the reflected beam is changed with the angle adjustment of the optical separator 3.

That is, since the optical separator 3, diffuser plate 4, and photodetector 5 are moved integrally, it is possible to make the reflected beam incident on the diffuser plate 4 and photodetector 5, even when a deviation of the optical path occurs with the angle adjustment of the optical separator 3.

Here, when the optical separator 3 is rotated by the angle $\theta_1$ about the optical axis 6, the reflected beam is similarly rotated by the angle $\theta_1$ about the optical axis 6, whereas when it is rotated by the angle $\theta_2$ about the straight line 9 perpendicular to the optical axis 6 of the laser beam and the incident surface of the laser beam, the reflected beam is rotated by the angle 2*$\theta_2$ about the straight line 9.

For this reason, with respect to the rotation about the straight line 9 perpendicular to the optical axis 6 of the laser beam and the incident surface of the laser beam, it is required to adjust the angle $\theta_2$ within a range such that no reflected beam is leaked from the diffuser plate 4.

However, practically, when the angle $\theta_2$ is adjusted, it is not conceivable that the angle is changed beyond the range leaked from the diffuser plate 4; thus, the above never becomes a major problem.

Furthermore, when the intensity of the laser beam is measured by separating a part of the laser beam, the optical separator 3 having a smaller reflectivity is desirable in order not to reduce as much as possible the output of the laser beam to be originally output.

On the other hand, if the reflectivity is too small, a sufficient amount of laser beam is not made incident on the photodetector 5 to thereby cause a measurement error thereof due to noise such as stray light.

Therefore, a rate of the laser beam to be separated by the optical separator 3 is a degree such that no measurement error in the photodetector 5 occurs.

Moreover, although it is desirable that the reflectivity of the optical separator 3 be as small as possible and adjustable for every apparatus, it becomes possible to adjust the rate of the laser beam to be separated by the optical separator 3 for every apparatus by changing the rotation angle of the optical separator 3 using the angle adjusting mechanisms 7, 8.

As is clear from the above, according to Embodiment 1, since it is configured such that the optical separator 3 is disposed in the position that is rotated by the predetermined angle about the optical axis 6 of the laser beam converged by the lens 2, and further rotated by the predetermined angle about the straight line 9 perpendicular to the optical axis 6 of the laser beam and the incident surface of the laser beam, there is rendered an advantageous effect that can measure accurately an intensity of the laser beam without using an expensive optical separator.

That is, when the angle $\theta_1$ of the optical separator 3 about the optical axis 6 and the angle $\theta_2$ about the straight line 9 perpendicular to the optical axis 6 of the laser beam and the incident surface of the laser beam are adjusted by the angle adjusting mechanisms 7, 8, it becomes possible to adjust the polarization direction (ratio of the P-wave and S-wave) of the laser beam incident on the reflection surface of the optical separator 3 and the reflectivities themselves of the P-wave and S-wave. In such a way, even in the converged laser beam having incident angles that differ depending on the incident positions, it becomes possible to average the differences in reflectivity according to the incident positions by the rotation mechanisms. Further, it is possible to avoid a problem of instability in laser output measurement with a partially reflective coating as in the prior art, and thus an accurate laser output measurement can be achieved at low cost.

Note that in this Embodiment 1, there is shown the case where the angle adjusting mechanisms 7, 8 adjust the angles $\theta_1$, $\theta_2$ of the optical separator 3; however, if the position in which the reflectivities of the optical separator 3 are averaged with respect to the deviations $\Delta\theta$ of the laser beam from the optical axis 6 is found in advance, the optical separator 3 may be fixed at that position; thus, in this case, the angle adjusting mechanisms 7, 8 for adjusting the angles $\theta_1$, $\theta_2$ of the optical separator 3 become unnecessary.

If it is unnecessary to equip the adjusting mechanisms 7, 8, the number of components can be reduced to thereby achieve cost reduction. Further, since the movable parts can be reduced, it is possible to enhance reliability of the laser output measuring apparatus.

Embodiment 2

In the above Embodiment 1, there is shown the case where the laser beam oscillated from the single laser oscillator 1 is made incident on the lens 2; however, it may be contemplated that laser beams oscillated from a plurality of laser oscillators are made incident on the lens 2.

Figure 10:
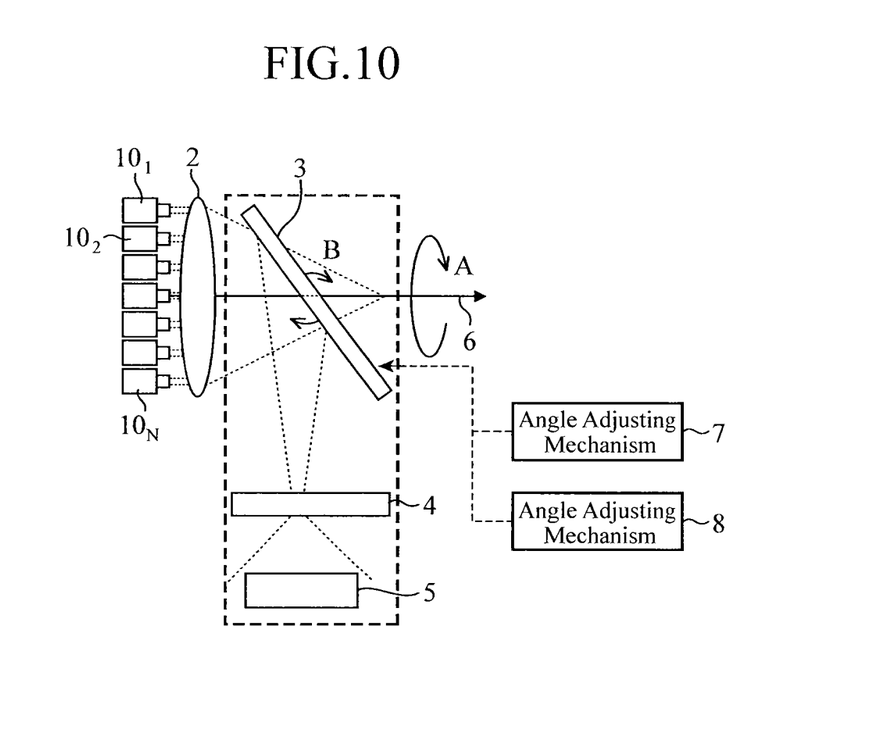
FIG. 10 is a side view showing a laser output measuring apparatus according to Embodiment 2 of the invention.

FIG. 10 is a side view showing a laser output measuring apparatus according to Embodiment 2 of the present invention. In the figure, the same reference numerals as those in FIG. 1 represent the same or equivalent parts, so that descriptions therefor will be omitted.

In the laser output measuring apparatus of FIG. 10, N (N is an integer of 2 or more) laser oscillators $10_1, 10_2, \ldots, 10_N$ are equipped.

Figure 11:
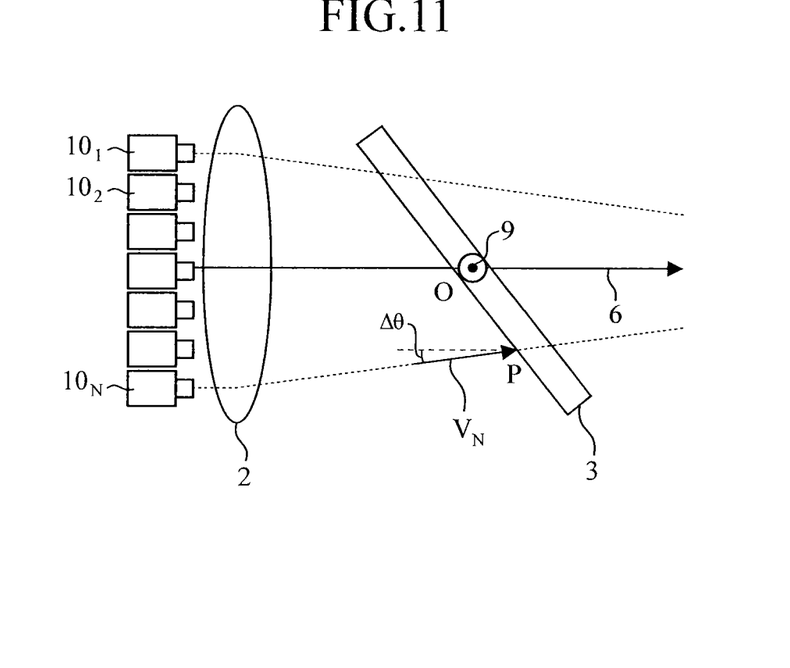
FIG. 11 is a side view showing a state in which a beam vector $V_N$ of a laser beam oscillated from a laser oscillator $10_N$ is made incident at a deviation angle $\Delta\theta$ with respect to an optical axis 6.

FIG. 11 is a side view showing a state in which a beam vector $V_N$ of the laser beam oscillated from the laser oscillator $10_N$ is made incident at a deviated angle $\Delta\theta$ with respect to the optical axis 6.

In Embodiment 2, the laser beam oscillated from the N laser oscillators $10_1$ to $10_N$ is made incident on the lens 2.

At this time, for example, the beam vector $V_N$ of the laser beam oscillated from the laser oscillator $10_N$ is made incident at the deviated angle $\Delta\theta$ relative to the optical axis 6, as shown in FIG. 11.

The reflectivity of the optical separator 3 is calculated as described in the above Embodiment 1 from the above formulae (1) to (3) on the basis of the angle $\Delta\theta$ from the optical axis 6.

Also in this Embodiment 2, similarly to the above Embodiment 1, it is possible to average reflectivities on the optical separator 3 of the laser beams oscillated from the N laser oscillators $10_1$ to $10_N$, in such a manner that angle adjusting mechanisms 7, 8 adjust the angles $\theta_1$, $\theta_2$ of the optical separator 3 on the basis of FIG. 9 in which calculation results by the formula (3) are shown.

Thus, even when the N laser oscillators $10_1$ to $10_N$ are mounted thereon, there is rendered an advantageous effect that an intensity of the laser beam can be measured accurately without using an expensive optical separator.

It is noted that the present invention can be implemented by a free combination of the embodiments, a modification of arbitrary components of the embodiments, or an omission of arbitrary components of the embodiments, within the scope of the invention.

INDUSTRIAL APPLICABILITY

The laser output measuring apparatus according to the present invention is suited to a case where in adjusting an output of the laser beam oscillated from the laser oscillator, the intensity of the laser beam needs to be measured.

DESCRIPTION OF REFERENCE NUMERALS AND SIGNS

1: laser oscillator, 2: lens, 3: optical separator, 4: diffuser plate, 5: photodetector, 6: optical axis of laser beam, 7: angle adjusting mechanism (first angle adjusting mechanism), 8: angle adjusting mechanism (second angle adjusting mechanism), 9: straight line, $10_1$ to $10_N$: laser oscillators, 101: laser oscillator, 102: optical separator, 103: photodetector, 104: optical axis of laser beam.

The invention claimed is:

1. A laser output measuring apparatus comprising:
   a lens that converges a laser beam incident thereon;
   an optical separator that reflects a part of the laser beam according to a polarization direction of the laser beam converged by the lens and a Fresnel reflectivity that depends on an incident angle of the laser beam;
   a photodetector that measures an intensity of the laser beam reflected by the optical separator;
   a first angle adjusting actuator that rotates the optical separator by a predetermined angle about an optical axis of the laser beam converged by the lens; and
   a second angle adjusting actuator that rotates the optical separator by a predetermined angle about an axis being a straight line perpendicular to the optical axis of the laser beam and an incident surface of the laser beam,
   wherein the optical separator is disposed by the first and second angle adjusting actuators such that the reflectivity of the optical separator is averaged with respect to a deviation of the laser beam from the optical axis.

2. The laser output measuring apparatus according to claim 1, wherein the lens is configured to converge laser beams oscillated by a plurality of laser oscillators.

3. The laser output measuring apparatus according to claim 1, wherein the optical separator and the photodetector are configured integrally, and the photodetector is rotated integrally with the optical separator when the optical separator is rotated by the first angle adjusting actuator.

4. The laser output measuring apparatus according to claim 1, wherein the laser beam made incident on the lens is a substantially linearly polarized beam.

5. The laser output measuring apparatus according to claim 1, further comprising a diffuser plate that is disposed between the optical separator and the photodetector, and that diffuses the laser beam reflected by the optical separator, and directs the diffused light from the laser beam incident on the photodetector.

* * * * *